US009855497B2

(12) United States Patent
Goslin et al.

(10) Patent No.: US 9,855,497 B2
(45) Date of Patent: Jan. 2, 2018

(54) TECHNIQUES FOR PROVIDING NON-VERBAL SPEECH RECOGNITION IN AN IMMERSIVE PLAYTIME ENVIRONMENT

(71) Applicant: Disney Enterprises, Inc., Burbank, CA (US)

(72) Inventors: Michael P. Goslin, Sherman Oaks, CA (US); Eric C. Haseltine, Silver Spring, MD (US); Joseph L. Olson, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 226 days.

(21) Appl. No.: 14/601,083

(22) Filed: Jan. 20, 2015

(65) Prior Publication Data

US 2016/0206955 A1 Jul. 21, 2016

(51) Int. Cl.
| | |
|---|---|
| G06F 17/00 | (2006.01) |
| A63F 13/215 | (2014.01) |
| G10L 17/26 | (2013.01) |
| G10L 25/18 | (2013.01) |
| G06F 3/01 | (2006.01) |
| G06F 3/16 | (2006.01) |
| G06F 3/0346 | (2013.01) |
| A63F 13/424 | (2014.01) |

(52) U.S. Cl.
CPC .......... *A63F 13/215* (2014.09); *A63F 13/424* (2014.09); *G06F 3/017* (2013.01); *G06F 3/0346* (2013.01); *G06F 3/167* (2013.01); *G10L 17/26* (2013.01); *G10L 25/18* (2013.01); *G06F 2203/0381* (2013.01)

(58) Field of Classification Search
USPC .............................................. 463/30–36, 42
See application file for complete search history.

(56) References Cited

U.S. PATENT DOCUMENTS 8,009,966 B2 *  8/2011  Bloom ................. G11B 27/034
                                                                386/285
8,456,298 B2   6/2013  Valtonen
(Continued)

OTHER PUBLICATIONS

Urban et al. "Recognition of Arm Gestures Using Multiple Orientation Sensors: Repeatability Assessment", 2004 IEEE Intelligent Transportation Systems Conference, Washington, D.C., USA, Oct. 3-6, 2004, 6 pages, <http:/ieeexplore.ieee.org/xpl/login.jsp?tp=&arnumber=1392960&url=http%3A%2F%2Fieeexplore.ieee.org%2Fxpls%2Fabs_all.jsp%3Farnumber%3D1398960>.

(Continued)

*Primary Examiner* — Ronald Laneau
(74) *Attorney, Agent, or Firm* — Patterson + Sheridan, LLP (57) ABSTRACT

An immersive play environment platform including techniques describing recognizing non-verbal vocalization gestures from a user is disclosed. A headset device receives audio input from a user. The headset device transmits the audio input to a controller device. The controller device evaluates characteristics of the audio input (e.g., spectral features over a period of time) to determine whether the audio input corresponds to a predefined non-verbal vocalization, such as a humming noise, shouting noise, etc. The controller device may perform an action in response to detecting such non-verbal vocalizations, such as engaging a play object (e.g., an action figure, an action disc) in the play environment.

20 Claims, 9 Drawing Sheets

(56) References Cited

U.S. PATENT DOCUMENTS

| | | | |
|---|---|---|---|
| 8,625,855 B2 | 1/2014 | El Dokor | |
| 8,781,151 B2* | 7/2014 | Marks | A63F 13/06 345/156 |
| 8,831,826 B2 | 9/2014 | Ricci | |
| 9,394,016 B2* | 7/2016 | Bernstein | B62D 61/00 |
| 9,395,725 B2* | 7/2016 | Bernstein | G05D 1/0088 |
| 2007/0021208 A1* | 1/2007 | Mao | G06F 3/017 463/36 |
| 2008/0192005 A1 | 8/2008 | Elgoyhen et al. | |
| 2009/0265671 A1 | 10/2009 | Sachs et al. | |
| 2012/0036433 A1 | 2/2012 | Zimmer et al. | |
| 2013/0266147 A1* | 10/2013 | Berres | G06F 17/30743 381/56 |
| 2013/0278501 A1 | 10/2013 | Bulzacki | |
| 2013/0328763 A1 | 12/2013 | Latta et al. | |
| 2014/0055396 A1 | 2/2014 | Aubauer et al. | |
| 2014/0071076 A1 | 3/2014 | Dogra et al. | |
| 2014/0184496 A1 | 7/2014 | Gribetz et al. | |

OTHER PUBLICATIONS

Kang et al. "Recognition-based gesture spotting in video games", available online Aug. 4, 2004, 14 pages <http://www.sciencedirect.com/science/article/pii/S0167865504001576>.

U.S. Appl. No. 14/601,083, entitled "Techniques for Providing Non-Verbal Speech Recognition in an Immersive Playtime Environment", filed Jan. 20, 2015.

U.S. Appl. No. 14/601,105, entitled "Tracking Specific Gestures Relative to User Movement", filed Jan. 20, 2015.

\* cited by examiner

| HUM GESTURE (505) | SHOUT GESTURE (510) |
|---|---|
| Ahhh | KA |
| Ohhh | HA |
| Ssss | KI |
| Zzzz | OY |
| Grrr | HO |
| mmmm | POW |

| ACTION (515) | HUM / SHOUT GESTURE COMBINATION (520) |
|---|---|
| PUSH | Ahhh / HA |
| LIGHTNING | Zzzz / KA |
| CHOKE | Ssss / KI |
| . . . | . . . |

TECHNIQUES FOR PROVIDING NON-VERBAL SPEECH RECOGNITION IN AN IMMERSIVE PLAYTIME ENVIRONMENT

BACKGROUND

Field

Embodiments of the present disclosure generally relate to inter-device communications, and more specifically to techniques for using interactive devices to perform actions in response to non-verbal vocalizations in an immersive playtime environment.

Description of the Related Art

Many approaches exist for delivering a play experience to a user. For instance, video games engage participants using interactive game play using a video game console, a hand-held controller, and a display (e.g., a television, a monitor on the video game system, etc.). A participant interacts with the controller to send commands to the video game system to control a video game or other simulation. However, while video games allow participants to interact directly with the video game system, such interactions are often limited to the graphical depiction shown on the display and rarely influence any other objects outside of the world provided by the video game.

SUMMARY

One embodiment presented herein describes an immersive play experience platform. The platform generally includes an audio device configured to receive audio input. The platform also includes a controller device configured to perform an operation for recognizing non-verbal vocalizations. The operation itself generally includes receiving audio input transmitted by the audio device. Upon determining that the audio input matches spectral features of one or more predefined non-verbal vocalizations, an action is performed corresponding to the one or more predefined non-verbal vocalizations.

Another embodiment presented herein describes a method for recognizing non-verbal vocalizations. The method generally includes receiving audio input. Upon determining that the audio input matches spectral features of one or more predefined non-verbal vocalizations, an action is performed corresponding to the one or more predefined non-verbal vocalizations.

Yet another embodiment presented herein describes a non-transitory computer-readable storage medium storing instructions, which, when executed on a processor, perform an operation for recognizing non-verbal vocalizations. The operation itself generally includes receiving audio input. Upon determining that the audio input matches spectral features of one or more predefined non-verbal vocalizations, an action is performed corresponding to the one or more predefined non-verbal vocalizations.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

An immersive play environment uses a plurality of interactive devices configured within a given setting (e.g., a living room, a vehicle, a park) to provide sensory entertainment experience to the user, giving the user the illusion of being in another setting (e.g., a forest on a different planet, a flight hangar, a sports arena, etc.). For example, a controller device could detect when a user performs a given action using a prop device, such as a toy gun, that transmits signals to the controller device whenever fired at a target, e.g., an interactive toy object. In response, the controller device can cause the interactive devices to perform audio-visual effects such as blast sounds from the toy gun, reaction sounds from the toy object, etc. The controller device could also cause the interactive toy object to perform physical movement, such as falling over or jumping.

One challenge in delivering immersive play experiences is situations where the environment provides the user with the illusion of having superhuman abilities. Continuing the previous example, assume the play environment is a Star Wars®-themed environment, and instead of a toy gun, the experience is used to provide the illusion that the participant has "the Force." That is, rather than using a prop (e.g., a toy gun), the participant engages the play environment as if having a power that can manifest itself physically, e.g., through a telekinetic push, lighting, choking, etc.

In one embodiment, the immersive play environment provides this experience by recognizing a specific set of gestures performed by the user. Embodiments presented herein describe techniques for using non-verbal speech recognition to deliver a play experience to a user. In one embodiment, an immersive play environment includes a plurality of interactive devices, such as a headset, wearable tracking sensors, a controller device, an interactive toy object, and an action disk. The interactive toy object may be positioned on the action disk. The controller device provides sensing and feedback mechanisms used to instruct the devices to interact with one another.

In one embodiment, the controller device recognizes a specific collection of non-verbal vocalizations, i.e., sounds made by a user that do not correspond to any particular word. Non-verbal vocalizations may include humming gestures (e.g., "Mmmm," "Ohhhh," "Ahhhh," etc.) or shouting gestures (e.g., "HA," "KA," "HO," etc.). The controller device may receive audio input of such non-verbal vocalizations from the headset device.

In one embodiment, combinations of humming gestures and shouting gestures can be associated with a particular action performed by the user to accomplish goals or tasks as part of an interactive script. For example, a combination of an "Ahhhh" humming gesture and a "HA" shouting gesture could be associated with a "Force Push" action, where the user desires to shove a target telekinetically, as if actually using telekinetic powers. To illustrate, assume a user assumes a specific pose and makes an "Ahhhh" humming noise while staring in the direction of an interactive toy object (e.g., an action figure). The controller device receives the audio input from the headset. The controller device can detect features in the audio input spectrum that correspond to a predefined non-verbal vocalization. Further, the controller device may also instruct other interactive devices in the environment to emit lights and play sounds to indicate a "growing" reserve of power as the user prolongs the humming noise. In addition, the controller device can also require a physical gesture by the user (e.g., detected by a sensor device worn by the user) in addition to the humming noise, such as the user bending his or her arms back.

Further, assume that after making the humming noise, the user changes stance and shouts "HA". The controller device can detect the "HA" shouting noise as a non-verbal vocalization matching one from the predefined collection. Similar to the humming noises, the controller device detects features in the audio input spectrum that correspond to a predefined vocalization. The controller device may detect that the humming noise and the shouting noise (and possibly physical gestures, such as the user moving his or her hands forward) are associated with a scripted sequence and a specified action, i.e., a "Force Push." That is, the specified sequence may require that the user draws a given amount of power (by prolonging the humming noise) and then uses that power (by making the shouting noise) within a certain amount of time. In response, the controller device can cause actions corresponding to a "Force Push" to occur in the immersive play environment. For example, the controller device can transmit instructions to the action disc to cause the interactive toy object to fall over (e.g., through a spring loaded actuator). In addition, the controller device can instruct the interactive toy object to make a noise as a reaction to the "Force Push."

Advantageously, recognizing non-verbal vocalizations to perform actions provides a flexible interactive element for an immersive play environment. Rather than rely solely on game controllers or props to provide a play experience to a user, the environment allows a user to use combinations of non-verbal vocalizations (e.g., humming gestures, shouting gestures, and the like) to perform some desired action, such as engaging an interactive object, build up player statistics (e.g., health, power, etc.), and the like. Further, using minimalist sound gesture combinations to convey abilities such as superhuman powers (e.g., the Force) can enhance an overall play experience for the user.

Note, the following describes a Star Wars®-themed immersive play environment as a reference example of recognizing non-verbal speech to perform responsive actions, in particular with regard to "the Force." However, one of ordinary skill in the art will recognize that embodiments described herein can apply to a variety of play settings. For example, embodiments may be applicable in a play experience that provides a user with superhuman powers. As another example, embodiments may be applicable for a variety of activities beyond superhuman powers in a play experience. For instance, a user can make a clicking sound at the mouth to summon a remote-controlled toy.

Figure 1A:
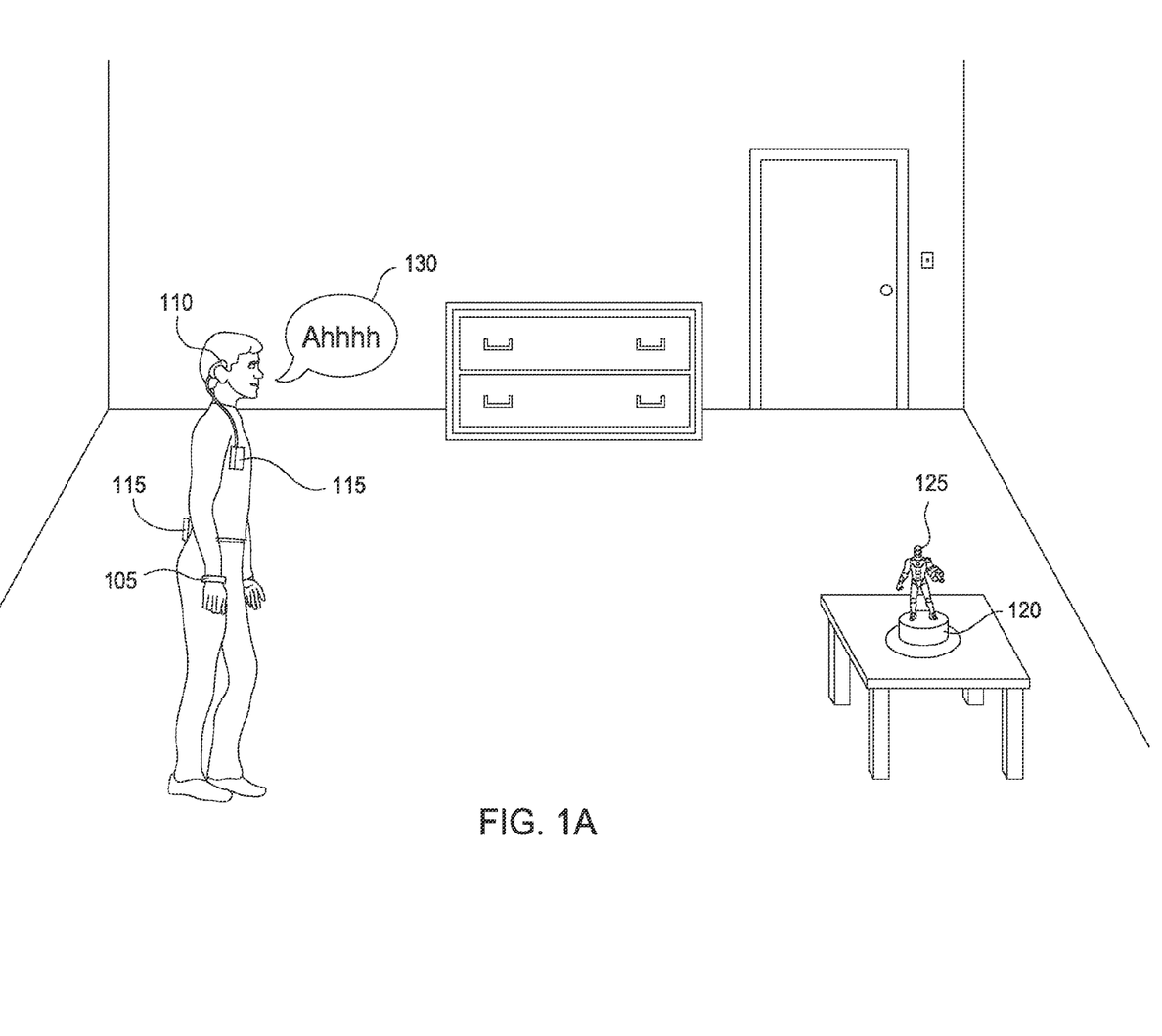
FIGS. 1A and 1B illustrate a playtime environment where a controller is instructing interactive devices to perform an effect, according to one embodiment.
Figure 1B:
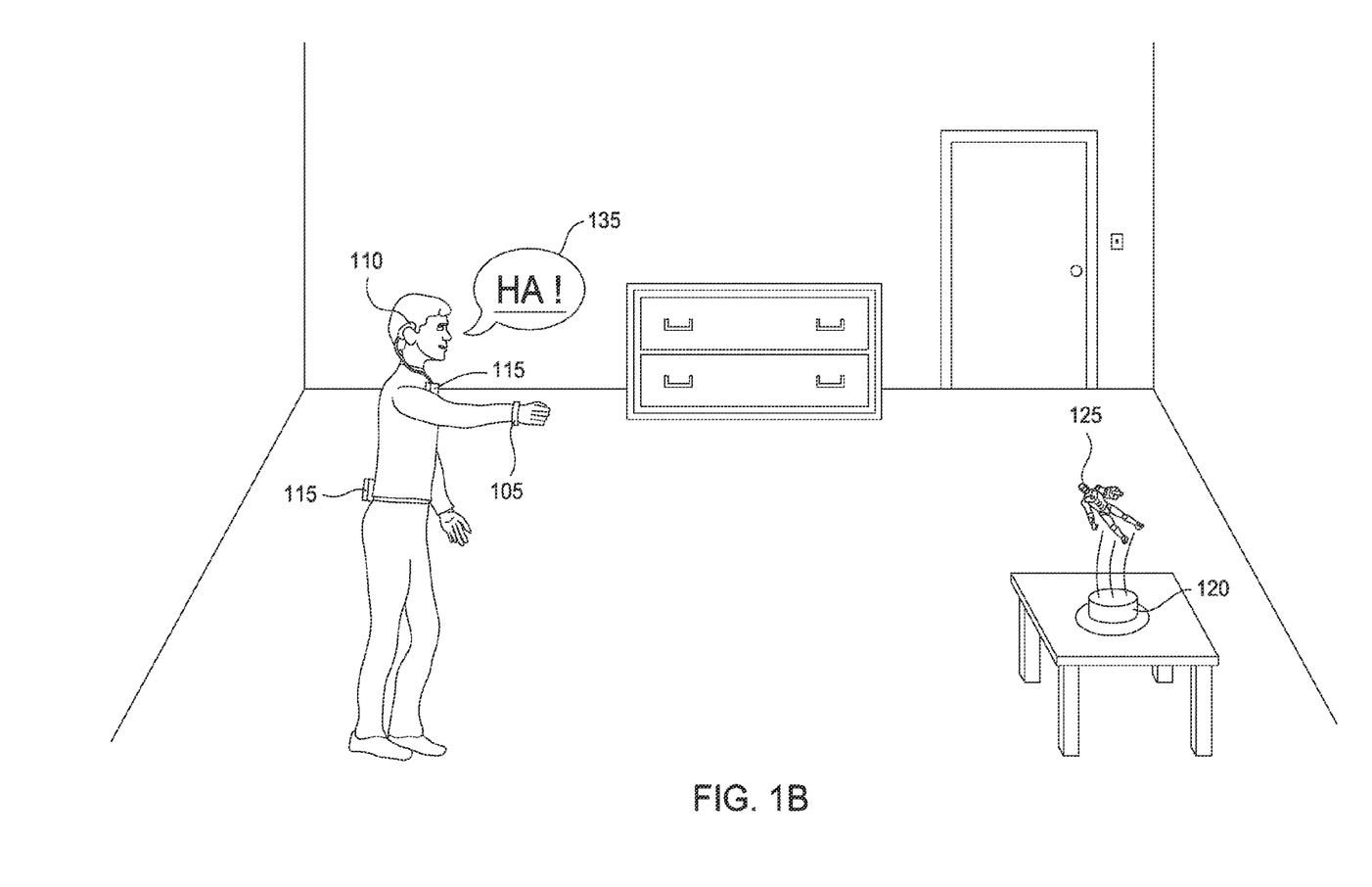

FIGS. 1A and 1B illustrate a playtime environment where interactive devices cooperate to respond to non-verbal speech in recreating play scenarios for a user, according to one embodiment. FIG. 1A displays a user equipped with several wearable devices, including a sensor wristband 105, a bone-conduction headset 110, and a controller device 115. In one embodiment, the controller device 115 receives audio and kinetic input from the sensor wristband 105 and bone conduction headset 110. As an example, the controller device 115 may receive input from the sensor wristband 105 when the sensor detects the user initiating, performing, and/or completing any scripted gestures or stances. In one embodiment, the sensor wristband 105 may include an accelerometer and gyroscope. Doing so provides a nine-degrees-of-freedom configuration for tracking a position and orientation of the user. Further, the controller device 115 may receive input from the bone conduction headset 110 when the headset detects vocalizations (e.g., speech, sounds, etc.) from the user.

The bone conduction headset 110 includes a microphone to capture speech and vocalizations from a user. The microphone may be situated away from the mouth of the user on the side of the user's face. Doing so allows the bone conduction headset 110 to detect subtle vocalizations from the user, such as humming. In one embodiment, the bone conduction headset 110 includes a preamplifier that prepares audio input received for further processing. For instance, the preamplifier reduces noise and interference from audio input.

The controller device 115 processes both verbal and kinetic data received from the wristband 105 and the headset 110. Further, the controller device 115 can perform specified actions, depending on the particular combination of inputs matching a scripted sequence. For example, the controller device 115 can cause sound effects to play from external audio speakers in response to the wristband 105 detecting motion corresponding to a physical action (e.g., swipe, punch, thrust, etc.). In addition, the controller device 115 can also cause lighting effects to play from external devices (e.g., an action disc device 120) as the user progresses through a choreographed action and dialogue.

In one embodiment, the controller device 115 also communicates with an action disc 120 to provide additional effects in response to verbal and kinetic input. That is, while the devices 105, 110, and 115 may include hardware resources to perform audiovisual effects, other embodiments may include toy devices that possess limited or no interactive capabilities. Such embodiments may be preferable, for example, when seeking to minimize expenses in manufacturing devices for the play environment. In such an embodiment, the interactivity of the devices can be achieved by configuring inert toy devices with the action disc device 120. Generally, the action disc device 120 provides a modular way to incorporate interactivity into a compatible device (e.g., a toy action FIG. 125) within a networked ecosystem of devices. For instance, the action disc device 120 could be configured to receive broadcasted commands from the controller device 115 and to perform an audiovisual action in response e.g., using lighting effects, sound effects, and a spring-loaded actuator (or other mechanical activator).

In one embodiment, the controller device 115 may trigger discrete audiovisual effects (e.g., discrete expressions of movement, sound, light, etc.) by broadcasting infrared signals to the action disc device 120. Additionally, some toy devices may be configured to control the action disc directly to render a complex sequence of behaviors via a stream of infrared commands. As a result, the action disc device 120 and the toy action FIG. 125 can appear to react to both physical stimuli and cues made in context of a story or choreographed sequence (e.g., using non-verbal vocalizations to represent "the Force").

For instance, in one embodiment, a given toy object and the controller device 115 can direct actions performed by the action disc device 120 by transmitting a combination of radio-frequency (RF) and infrared signals to control sound, light, and motion produced by the action disc device 120 (or other elements of the immersive play environment). Additionally, such signals can trigger scripts or macros stored within program memory or firmware within the action disc device 120, causing the device 120 to perform a sequence of audiovisual effects. Moreover, such signals can communicate in the absence of line-of-sight between the more sophisticated toy (or controller 115) and the action disc device 120 though high power output and RF receivers.

Illustratively, a toy action FIG. 125 is mounted on the action disc device 120. The action FIG. 125 could include a spring-loaded actuator at its base, such that, when released, causes the action FIG. 125 to fall over from a standing position. In such a case, the action disc device 120 could trigger a release mechanism within the disc, causing the action FIG. 125 to fall over. Doing so enables low cost toys to operate in conjunction with the controller device 115 and more sophisticated toy devices and reduces battery consumption relative to moving the toy device through electrical means (e.g., vibration from an electric motor within the action disc device 200).

In one embodiment, the controller device 115 can recognize non-vocalizations uttered by a user that are captured by the headset 110. Generally, non-verbal vocalizations include noises by the user that do not correspond to any particular word. Such non-verbal speech can include humming noises, shouting noises, grunts, coughing noises, and the like. Further, the controller device 115 can be configured to recognize certain predefined non-verbal speech and perform specified actions in response. For example, the controller device 115 may detect spectral features corresponding to such non-verbal speech.

In one embodiment, given a combination of non-verbal vocalizations, the controller device 115 can cause the action disc device 120 to perform a corresponding action. For example, as illustrated in FIG. 1A, the user is making a humming noise 130, i.e., "Ahhhh." The headset 110 transmits the audio input to the controller device 115. In turn, the controller device 115 determines whether the input corresponds to any predefined non-verbal vocalization. To do so, the controller device 115 may measure amplitudes and timings of the speech input against specified thresholds associated with a specified vocalization. For example, a humming gesture may correspond to a sound of with a relatively low amplitude made consistently over a period of time. In one embodiment, if so determined, the controller device 115 detects that the user is initiating a specified action. Further, in one embodiment, the controller device 115 may detect features in the audio spectrum over time. For example, for a humming gesture, an initial humming sound may initiate an event gesture having a non-finite duration. During this duration, the controller device 115 may detect signal features, such as distinct spikes and valleys, in the audio spectrum that correspond to a given predefined non-verbal vocalization. The controller device 115 may measure timing and amplitude thresholds to confirm that the audio corresponds to the predefined non-verbal vocalization. Doing so allows the controller device 115 to provide real-time feedback.

FIG. 1B depicts the same scene of FIG. 1A after the user begins making a humming noise 130 captured by the headset 110. The controller device 115 has received the humming noise 130 as input. Illustratively, the user is now making a shouting noise 135, i.e., "HA!" The headset 110 captures and sends the input to the controller device 115. As further illustrated, the user also changes position by raising his right arm (and the sensor wristband 105 along with it). The sensor wristband 105 transmits position and orientation information to the controller device 115. In turn, the controller device 115 may identify a action corresponding to the combination of non-verbal speech input and orientation. In this example case, the action is to cause the action disc device 120 to activate the spring-loaded actuator on the action FIG. 125, in turn causing the action FIG. 125 to fall over. Doing so provides the illusion to the user of performing a "Force Push" action on the action FIG. 125. Further, in the play experience setting, the action FIG. 125 may have an associated damage meter that can be decreased after the "Force Push" action.

In one embodiment, the controller device 115 may distinguish between specified persistent non-verbal speech vocalizations, such as a hum, buzz, or a hiss. As stated, to recognize a specified persistent vocalization, the controller device 115 may measure amplitudes, timings, and spectral features of a given sound against thresholds associated with a particular vocalization.

In addition, the controller device 115 may evaluate different threshold levels of amplitudes and timings. For example, controller device 115 may measure the timing of a humming sound against multiple thresholds. As a user maintains a humming sound for a longer period of time, the controller device 115 may determine that more timing thresholds are exceeded based on a specific choreographed sequence of movements and vocalizations. For instance, such a humming sound may represent a user "drawing" power to perform some action in the immersive play environment. In turn, the controller device 115 can be configured to perform different actions as a result of sounds maintained by the user for a longer period (e.g., a "stronger" attack on an action figure resulting in a greater amount of damage being inflicted).

Figure 2:
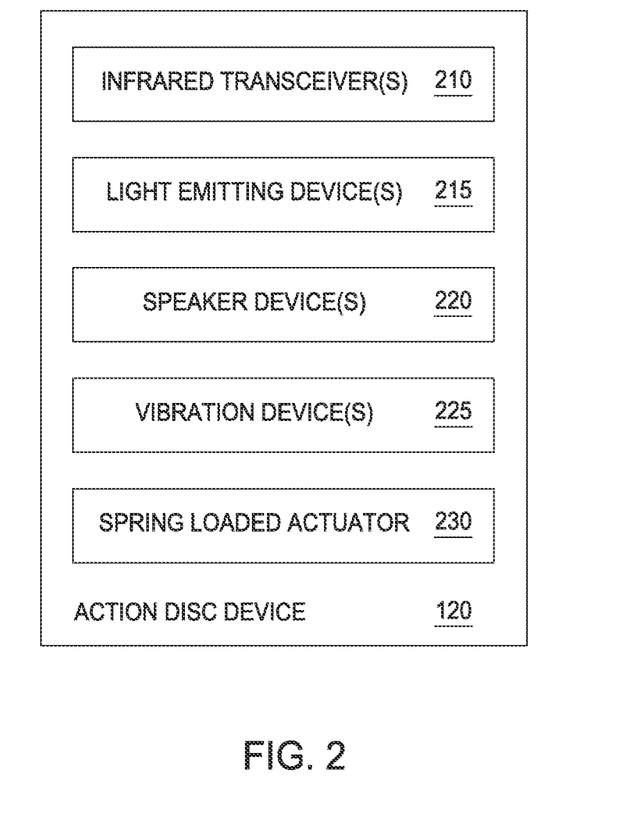
FIG. 2 illustrates an example action disc device, according to one embodiment.

FIG. 2 further illustrates the action disc device 120, according to one embodiment. As shown, the action disc device 120 includes infrared transceivers 210, light emitting devices 215, speaker devices 220, vibration devices 225, and a spring loaded actuator 230.

Using a modular device such as the action disc device 120 allows simple, inexpensive toys to be configured to express complex behaviors and respond to their physical environment as well as to choreographed sequences performed by the user. Additionally, using a spring-loaded actuator 230 (e.g., in response to combinations of non-verbal vocalizations and physical motions, the action disc device 120 conserves manufacturing cost and drain of the battery (as well as the required size of the battery) by using mechanically stored energy to provide effects. For instance, the spring-loaded actuator 230 could be triggered using a cam motion of a low-cost toy motor whose movement causes an object placed on the actuator (e.g., an action figure) to move or fall over, e.g., in response to non-verbal vocalizations received by the bone conduction headset 110.

Figure 3:
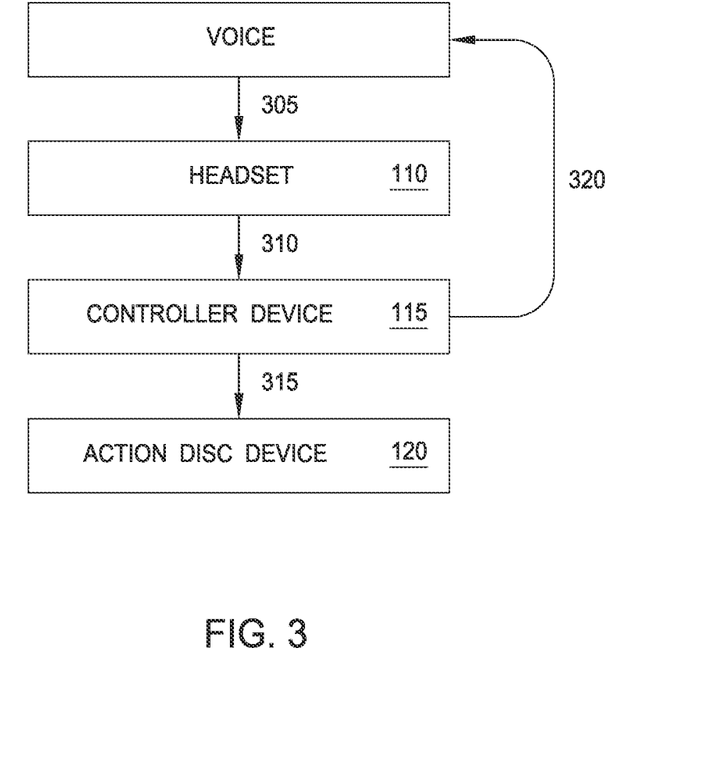
FIG. 3 illustrates a workflow describing device interaction when performing an action in response to non-verbal gestures, according to one embodiment.

FIG. 3 illustrates an example workflow of device interaction when performing actions in response to non-verbal vocalizations, according to one embodiment. In one embodiment, a participant in the immersive play experience is wearing a bone conductive headset 110, a controller device 115, and a sensor wristband 105. The user utters voice input into the headset 110 (at 305). Such voice input can be a humming gesture, used in this example to initiate a desired action.

The headset 110 detects and transmits audio input of the vocalizations to the controller device 115 (at 310). Once received, the controller determines whether the input corresponds to a predefined non-verbal vocalization. The controller device 115 further determines whether the non-verbal vocalization is part of a choreographed sequence, which may include a combination of gestures (e.g., sounds and kinetics) at different stages associated with an action to be performed (such as on an action figure mounted on the action disc device 120). If the non-verbal vocalization is part of a given combination and the combination is not yet satisfied (i.e., the stages of the choreographed sequence have not yet been completed), the controller device 115 awaits for further voice input (at 320). At each stage, the controller device 115 can instruct other devices to provide some sort of feedback, e.g., lights blinking with increasing frequency while the user makes a humming gesture.

If the controller device 115 detects that the user has completed the next stage in the choreographed sequence (e.g., performed a combination of specified gestures), the controller device 115 may transmit a command associated with the combination to the action disc device 120 (at 315). For example, the controller device 115 may cause the action disc 120 device to activate a spring loaded actuator and cause the action figure mounted on the action disc device 120 to fall. The controller device 115 may also cause lights to blink as the action occurs. Should the user fail to complete the sequence, the controller device 115 can deactivate any currently playing audiovisual effects.

Figure 4:
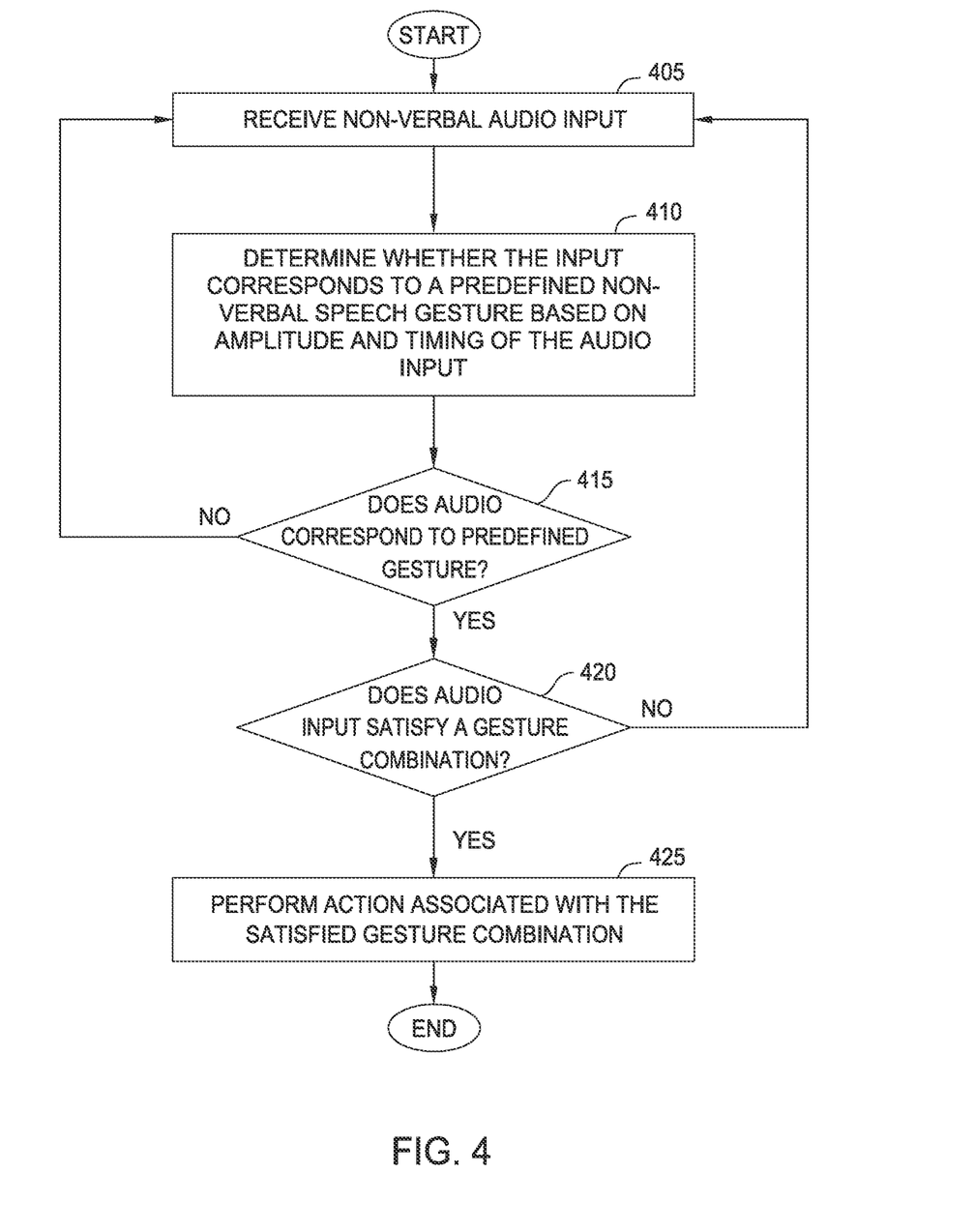
FIG. 4 illustrates a method for performing an action in response to recognizing non-verbal gestures, according to one embodiment.

FIG. 4 illustrates a method 400 for recognizing non-verbal speech sent to the controller device 115, according to one embodiment. Method 400 begins at step 405, where the controller device 115 receives non-verbal vocalizations from the bone conduction headset 115. As stated, non-verbal audio could be noise made by a user. Such audio may include humming noises, shouting noises, grunting, etc. For example, assume the controller device 115 receives a "Hmmm" noise.

At step 410, the controller device 115 determines whether the audio input corresponds to a predefined non-verbal vocalization. To do so, the controller device 115 may measure input features such as amplitude and timing of the audio against respective thresholds. Continuing the previous example, the controller device 115 can detect a "Hmmm" noise based on an amplitude being above a certain threshold with little change over time. The controller device 115 then initiates the choreographed sequence, e.g. the user drawing power. Further, the controller device 115 may also have a timing threshold required for a "Hmmm" noise, such as the given amplitude being maintained for at least 500 milliseconds. Further, in one embodiment, the controller device 115 may perform feature detection on the audio input. That is, when the user initiates a "Hmmm" noise, an event gesture may also be initiated. During this time, the controller device 115 can detect spectral features, such as spikes and valleys in the audio input spectrum, and provide feedback in real-time. For example, as the user prolongs the humming noise, the controller device 115 may instruct the action disc device 120 to blink lights at a higher frequency.

If the audio corresponds to a predefined gesture (at step 415), the controller device 115 determines whether the audio input satisfies required steps of a current stage in the choreographed sequence (e.g., through combinations of gestures) (at step 420). As stated, combinations of predefined gestures (e.g., sounds and kinetics) can be associated with a particular action desired by the user. For example, a combination of a humming gesture and a shouting gesture can be associated with a Force action in a Star Wars®-themed play environment. In addition, physical gestures detected by the wristband may be included in such a predefined combination. For example, a specific choreographed sequence may require that the user bend his or her arms back while making the humming gesture. If the most recent input is a part of a combination but does not yet satisfy the combination, then the method returns to step 405, where the controller device 115 may detect additional input.

Continuing the previous example, assume that the next audio input received is a shout gesture, e.g., a "HA!" noise uttered by the user, taking place some milliseconds after the humming gesture. The controller device 115 can typically recognize a shout gesture based on a single spike in amplitude, recognized within fifty milliseconds of the spike. The combination of the "Hmmm" humming gesture and the "HA!" shouting gesture may be associated with a particular action, such as a Force push. Further, as stated, the combination sequence may also be associated with specific physical gestures to accompany the sounds. For example, as the user makes a "HA!" shouting gesture, the choreographed sequence may also require the user to also push his or her hand forward.

At step 425, if the audio input satisfies a gesture combination, then the controller device 425 performs an action associated with the combination. For example, if the action corresponds to a "Force Push," the controller device 425 may transmit instructions to the action disc device 120 to release a spring loaded actuator on an action figure sitting atop the device 120. Doing so causes the action figure to fall over.

Figure 5:
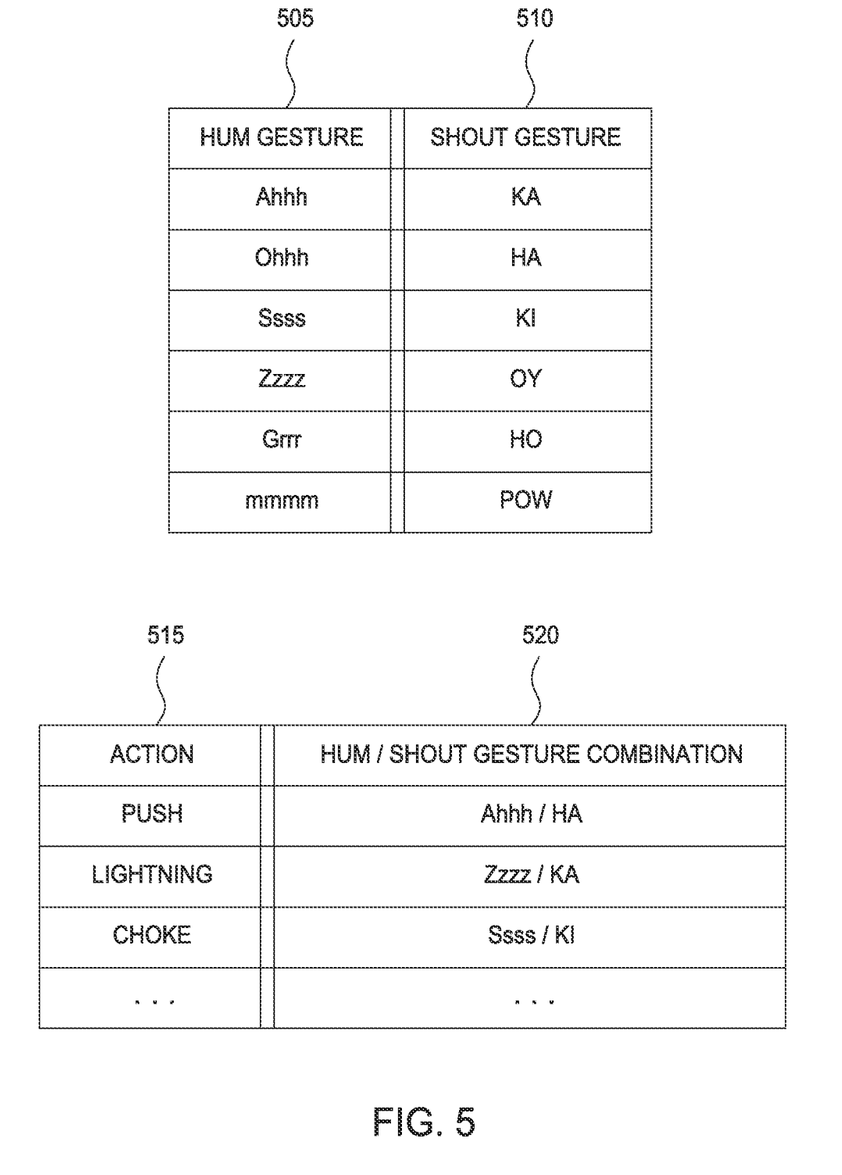
FIG. 5 illustrates listings of example non-verbal speech gestures and actions performed in response to combinations of such gestures, according to one embodiment.

FIG. 5 illustrates listings of example non-verbal speech gestures and actions performed in response to combinations of such gestures according to one embodiment.

List 505 describes various humming gestures recognizable by the controller device 115, e.g., "Ahhh," "Ohhh," "Ssss," "Zzzz," "Grrr," and "Mmmm." In one embodiment, the controller device 115 may identify each of the humming gestures based on spectral content for distinct features as well as amplitudes of each of the noises maintained for a specified amount of time, e.g., after 500 milliseconds. List 510 describes various shouting gestures recognizable by the controller device 115, e.g., "KA," "HA," "KI," "OY," "HO," and "POW." In one embodiment, the controller device 115 may identify each of the shouting gestures based on a spike in amplitude for a given noise.

As stated, the choreographed sequence, e.g., combinations of physical and sound gestures, can be associated with an action to be performed, such as the playing of an environmental sound, added narration, battling an opponent, etc. When the controller device 115 detects a combination of gestures satisfying a given stage of the choreographed sequence, the controller device 115 may perform the specified action or transmit instructions to an appropriate device (e.g., the action disc device 120). Columns 515 and 520 provide a chart of examples of gesture combinations are provided by a chart with columns 515 and 520. Column 515 lists particular humming and shouting gesture combinations, while column 520 lists actions corresponding to each gesture combination when the gestures are performed in sequence. For example, a combination of a humming gesture of "Zzzz" and a shouting gesture of "KA" may be associated with a "Force Lightning" move, where a target in the immersive play environment is struck by the "Force Lightning." The controller device 115 may transmit instructions to the action disc device 120 to emit audio depicting lightning noises from speaker devices as well as activate a spring loaded actuator to cause a mounted action figure to fall over.

Note, the combinations are provided as examples of actions that can be performed in response to non-verbal vocalization gestures. Although not listed in FIG. 5, the combinations may also include kinetic input as well. Continuing the previous example of "Force Lightning," the combination may also require that the user not only provide the humming and shouting gestures but also raise both wrists and cup both hands. The wristband sensor 105 would relay position and orientation information related to the gesture and transmit the information to the controller device 115. In turn, the controller device 115 recognizes the gesture as part of the "Force Lightning" combination.

Figure 6A:
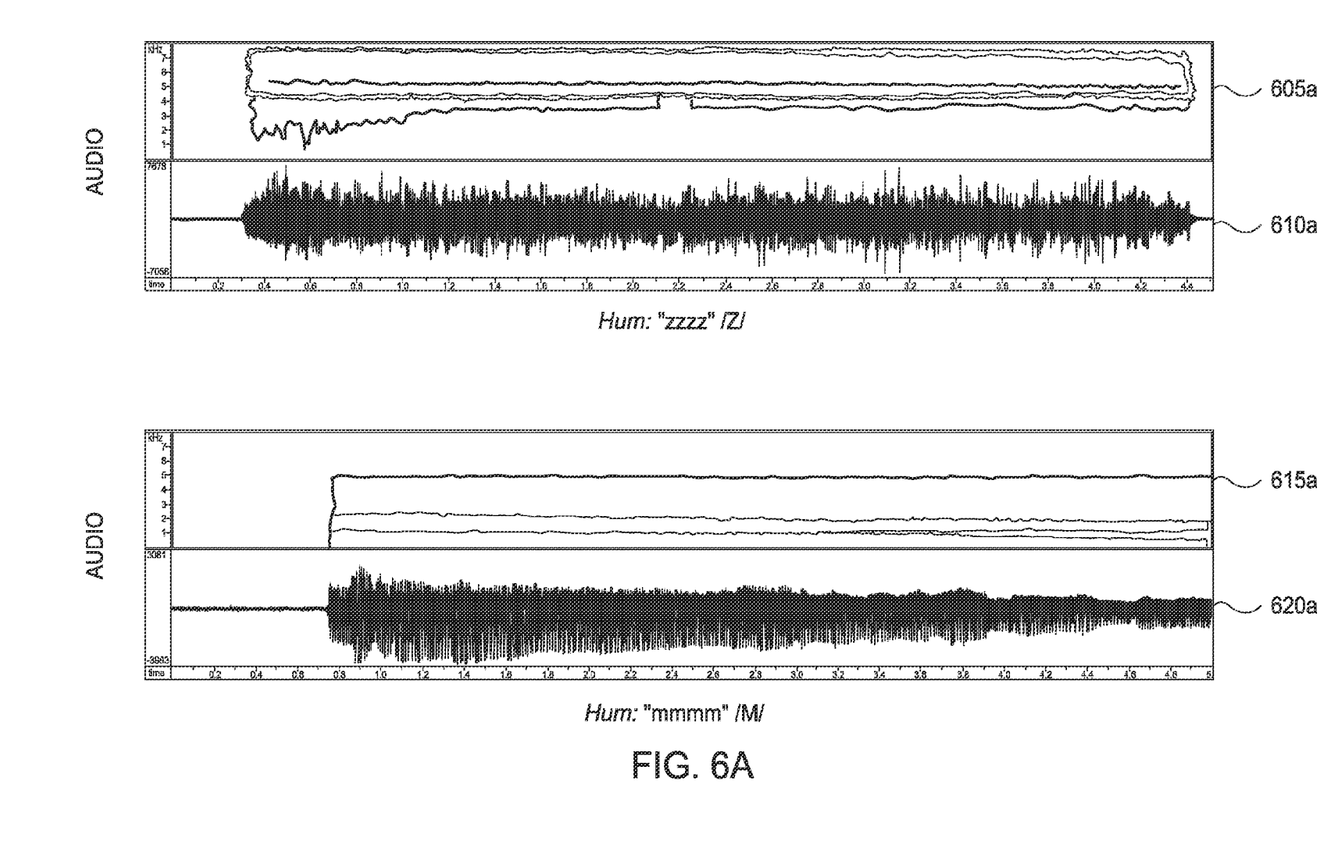
FIGS. 6A and 6B illustrate example audio bands of recognizable non-verbal speech gestures, according to one embodiment.
Figure 6B:
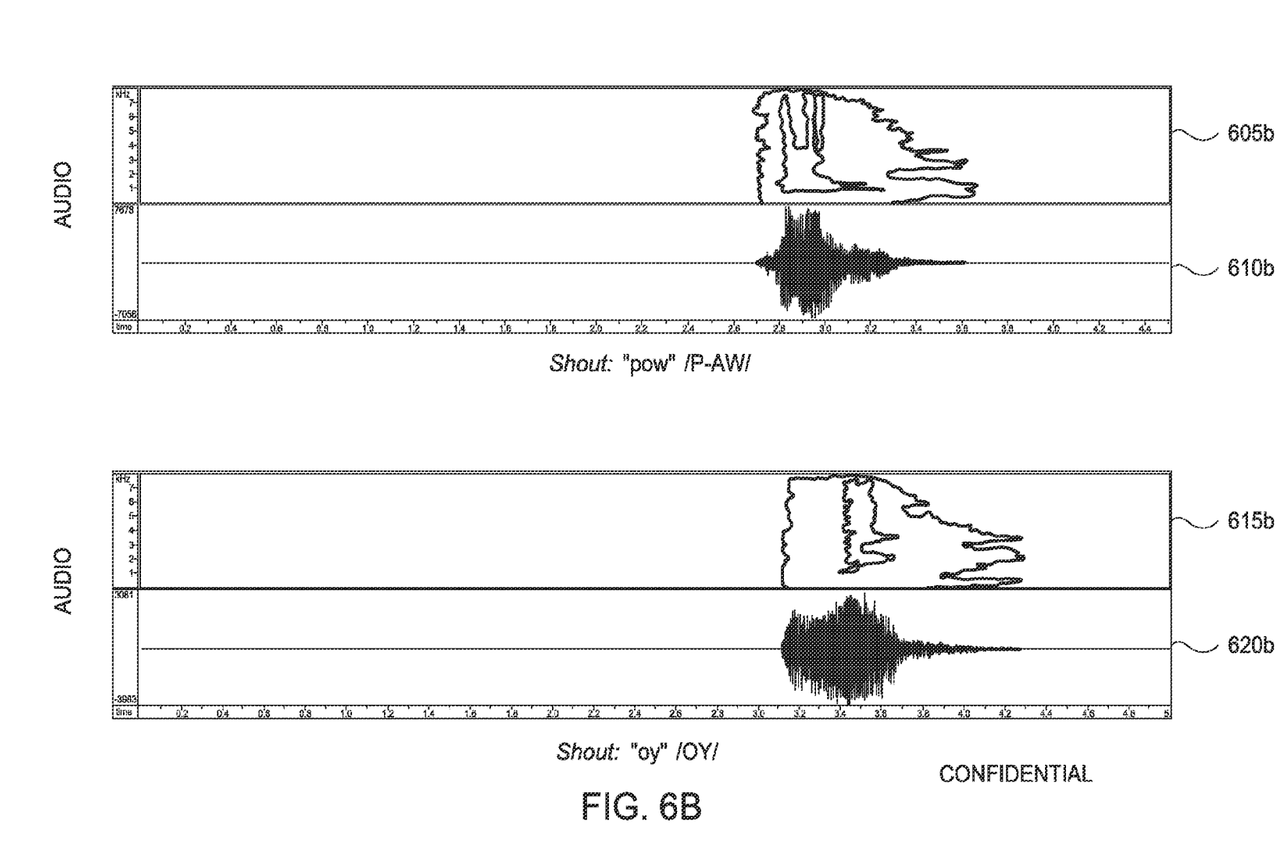

FIGS. 6A and 6B illustrate example audio inputs of recognizable non-verbal speech gestures, according to one embodiment. FIG. 6A depicts examples of non-verbal humming gestures "Zzzz" and "Mmmm" made over a given interval. Spectrum 605a depicts a spectrum band representing the "Zzzz" gesture. Frequency 610a depicts a frequency band representing the same. Spectrum 615a depicts a spectrum band representing the "Mmmm" gesture. Frequency 620a depicts a frequency band representing the same. As stated, the controller device 115 may detect features in a given spectrum to determine whether the features belong in a predefined non-verbal vocalization, such as in spectrum 605a and spectrum 615. Further, the controller device 115 may measure the amplitude over time in the frequency band to further identify the predefined non-verbal vocalization.

FIG. 6B depicts examples of non-verbal shouting gestures "POW" and "OY" made over a given interval. Spectrum 605b depicts a spectrum band representing the "POW" gesture. Frequency 610b depicts a frequency band representing the same. Spectrum 615b depicts a spectrum band representing the "OY" gesture. Frequency 620b depicts a frequency band representing the same. Note that, compared to the bands of FIG. 6A, the bands of FIG. 6B both display a relatively shorter amount of input over time.

Figure 7:
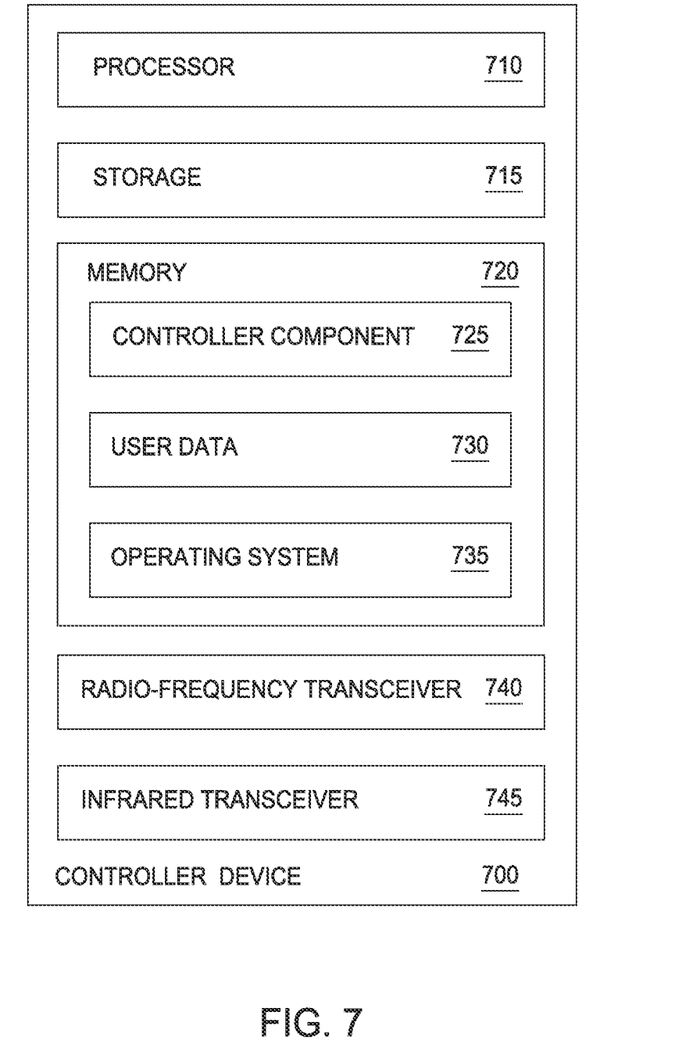
FIG. 7 illustrates an example controller device configured to recognize non-verbal speech gestures, according to one embodiment.

FIG. 7 illustrates an example controller device 700 configured to recognize non-verbal speech gestures, according to one embodiment. As shown, the controller device 700 includes a processor 710, storage 715, memory 720, a radio-frequency transceiver 740 and an infrared transceiver 745. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the controller device 700 to transmit and receive radio-frequency signals. Likewise, the infrared transceiver 745 allows the device 700 to transmit and receive infrared signals. Further, while the depicted embodiment illustrates the components of a particular controller device 700, one of ordinary skill in the art will recognize that interactive objects may use a variety of different hardware architectures. Moreover, it is explicitly contemplated that embodiments may be implemented using any device or computer system capable of performing the functions described herein.

The memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the controller device 700. Illustratively, the memory 720 includes a controller component 725, user data 730 and an operating system 735. The operating system 735 generally controls the execution of application programs on the controller device 700.

Generally, the controller component 725 configures the interactive objects (e.g., the action disc device 120, action FIG. 125) to perform particular actions. The particular actions can also be based on the user data 730 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 725 is configured with logic for recognizing particular events and broadcasting commands for the devices to perform a corresponding action(s) in response. In such an embodiment, the controller component 725 could use input/output devices (e.g., cameras, microphones, wireless transceivers, infrared sensors, etc.) to detect when a particular event occurs. For instance, the controller component 725 could use a camera to detect when a particular projection appears, and could then broadcast a command (e.g., using a RF signal) instructing the devices to perform a corresponding action in response. As another example, the controller component 725 could receive a wireless signal (e.g., an RF signal, data communicated using Bluetooth communications, etc.) from another one of the devices, such as a bone conduction headset, indicating that a particular action has been performed, such as a vocalization from the user. For instance, the controller component 725 could receive a non-verbal audio input from the headset. In response, the controller component 725 can determine whether the audio corresponds to a recognized non-verbal gesture. The device could then broadcast a signal instructing one or more other devices to perform a corresponding action responsive to receiving the signal.

In a particular embodiment, the controller component 725 is configured to synchronize actions of multiple devices. For instance, the controller component 725 could broadcast a message to the devices, instructing the devices to perform a particular audiovisual effect immediately upon receiving the message. As another example, the controller component 725 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

Generally speaking, the devices and the controller 700 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An immersive play experience platform providing an interactive environment, comprising:
   an audio device configured to receive audio input; and
   a controller device configured to perform an operation for recognizing non-verbal vocalizations, the operation comprising:
      receiving audio input transmitted by the audio device,
      determining that the audio input matches spectral features of one or more predefined non-verbal vocalizations characterizing gameplay within the interactive environment, and
      causing an action corresponding to the one or more predefined non-verbal vocalizations to be performed on an interactive gameplay object within the interactive environment.

2. The platform of claim 1, further comprising:
   a physical device configured to receive instructions from the controller device to perform the corresponding action; and
   wherein the interactive gameplay object is connected with the physical device.

3. The platform of claim 2, wherein performing the corresponding action comprises:
   causing the interactive gameplay object to disconnect from the physical device.

4. The platform of claim 1, wherein the predefined non-verbal vocalizations include at least one of a humming gesture or a shouting gesture.

5. The platform of claim 1, further comprising:
   a sensor device having an accelerometer and a gyroscope, the sensor device configured to receive position and orientation input and to transmit the position and orientation input to the controller device.

6. The platform of claim 5, wherein the one or more predefined non-verbal vocalizations are associated with a choreographed sequence having one or more gestures corresponding to specified position and orientation input transmitted from the sensor device.

7. The platform of claim 1, wherein the predefined non-verbal vocalizations are further determined based on amplitude and timing thresholds measured in the audio input.

8. A method for recognizing non-verbal vocalizations, comprising:
   receiving, by a controller device executing on an immersive play experience platform providing an interactive environment, audio input;
   determining, by the controller device, that the audio input matches spectral features of one or more predefined non-verbal vocalizations characterizing gameplay within the interactive environment; and
   causing an action corresponding to the one or more predefined non-verbal vocalizations to be performed on an interactive gameplay object within the interactive environment.

9. The method of claim 8, further comprising, transmitting instructions to a physical device for performing the corresponding action.

10. The method of claim 9, wherein performing the corresponding action comprises:
    causing the interactive gameplay object to disconnect from the physical device.

11. The method of claim 8, wherein the predefined non-verbal vocalizations include at least one of a humming gesture or a shouting gesture.

12. The method of claim 8, further comprising, receiving position and orientation input.

13. The method of claim 12, wherein the one or more predefined non-verbal vocalizations are associated with a choreographed sequence having one or more gestures corresponding to specified position and orientation input.

14. The method of claim 8, wherein the predefined non-verbal vocalizations are further determined based on amplitude and timing thresholds measured in the audio input.

15. A non-transitory computer-readable storage medium storing instructions, which, when executed on a processor, perform an operation for recognizing non-verbal vocalizations, the operation comprising:
    receiving, by a controller device executing on an immersive play experience platform providing an interactive environment, audio input;
    determining, by the controller device, that the audio input matches spectral features of at least a first predefined non-verbal vocalization characterizing gameplay within the interactive environment;
    determining that the matched audio input is received as a part of a predefined sequence of gestures including at least a first physical gesture and the first predefined non-verbal vocalization, and
    causing an action corresponding to the predefined sequence of gestures to be performed on an interactive gameplay object.

16. The computer-readable storage medium of claim 15, wherein the operation further comprises, transmitting instructions to a physical device for performing the corresponding action.

17. The computer-readable storage medium of claim 16, wherein performing the corresponding action comprises:
    causing, via the physical device, the interactive gameplay object to disconnect from the physical device.

18. The computer-readable storage medium of claim 15, wherein the operation further comprises, receiving position and orientation input.

19. The computer-readable storage medium of claim 18, wherein the at least the first physical gesture matches specified position and orientation input.

20. The computer-readable storage medium of claim 15, wherein the at least the first predefined non-verbal vocalization is further determined based on amplitude and timing thresholds measured in the audio input.

* * * * *

UNITED STATES PATENT AND TRADEMARK OFFICE
CERTIFICATE OF CORRECTION

PATENT NO. : 9,855,497 B2
APPLICATION NO. : 14/601083
DATED : January 2, 2018
INVENTOR(S) : Michael P. Goslin et al.

Page 1 of 1

It is certified that error appears in the above-identified patent and that said Letters Patent is hereby corrected as shown below:

On the Title Page

In item (56), in Column 2, under "Other Publications", Line 5, delete "1392960" and insert -- 1398960 --, therefor.

In the Specification

In Column 5, Line 62, after "sound" delete "of".

Signed and Sealed this
Nineteenth Day of June, 2018

Andrei Iancu
*Director of the United States Patent and Trademark Office*